US006405411B1

(12) United States Patent
Allemann et al.

(10) Patent No.: US 6,405,411 B1
(45) Date of Patent: Jun. 18, 2002

(54) CATCH AT A PRESSRING

(75) Inventors: Rudolf Allemann, Kaltbrunn; Silvio Marti, Rapperswil, both of (CH)

(73) Assignee: Geberit Technik AG, Schachenstrasse (CH)

( * ) Notice: Subject to any disclaimer, the term of this patent is extended or adjusted under 35 U.S.C. 154(b) by 0 days.

(21) Appl. No.: 09/526,591

(22) Filed: Mar. 16, 2000

(30) Foreign Application Priority Data

Mar. 17, 1999 (CH) .............................................. 0489/99

(51) Int. Cl.[7] .......................... A44B 21/00; B23K 37/04

(52) U.S. Cl. ............................... 24/19; 24/270; 24/271; 24/273; 29/272; 29/464

(58) Field of Search ............................ 24/19, 31 C, 32, 24/270, 271, 273

(56) References Cited

U.S. PATENT DOCUMENTS

| | | | | | |
|---|---|---|---|---|---|
| 2,706,648 | A | * | 4/1955 | Gosse | 24/271 |
| 2,775,806 | A | * | 1/1957 | Love | 24/271 |
| 3,201,156 | A | * | 8/1965 | Coats | 24/273 |
| 3,705,737 | A | * | 12/1972 | Westerlund et al. | 285/365 |
| 4,207,776 | A | * | 6/1980 | Helt et al. | 74/235 |
| 4,272,871 | A | * | 6/1981 | Weinhold | 24/270 |
| 5,165,160 | A | * | 11/1992 | Poncelet | 29/464 |
| 5,666,711 | A | * | 9/1997 | Pfeiffer | 29/272 |

* cited by examiner

*Primary Examiner*—Victor Sakran
(74) *Attorney, Agent, or Firm*—Collen Law Associates; Robert M. McDermott

(57) ABSTRACT

The clasp comprises a coupling element with which the cheek plate elements adjacent to a closed position and comprising a coupling bolt for a closing device can be provisionally connected. The coupling element is a bracket which is mounted at its one end so that it can pivot on the coupling bolt of the one cheek plate element and which can be connected by its other end to the other cheek plate element in such a manner that this other end is movably mounted in the coupled position on the other cheek plate element.

17 Claims, 3 Drawing Sheets

CATCH AT A PRESSRING

FIELD OF THE INVENTION

The invention is relative to a catch (clasp) on a pressring (shaping ring) with several cheek plate elements connected to each other in an articulated fashion, with a coupling element with which the cheek plate elements adjacent to a closed position and comprising a coupling bolt for a closing device can be provisionally connected.

BACKGROUND OF THE INVENTION

A clasp of this type is known in the state of the art from EP 0671984. It comprises a coupling element which has a first coupling shackle articulated to a cheek plate element and a second coupling shackle connected to the other cheek plate element. These two coupling shackles can be connected by a coupling bolt which engages into both and which must be rotated to close the coupling member. In the coupled state, the coupling member is designed to be flexible.

SUMMARY AND OBJECTS OF THE INVENTION

The present invention creates a clasp of the cited type which can be produced in a simpler and more economical manner and, in addition, is simpler to manipulate.

The present invention solves the problems of a generic clasp in that the coupling element of the present invention is a bracket [curved piece of metal] mounted so that it can pivot on its one end on the coupling bolt of the one cheek plate element and which can be connected by its other end to the other cheek plate element in such a manner that this other end is movably mounted on the other cheek plate element in the coupled position.

In the clasp according to the invention the coupling element is a bracket movably mounted on its pivotable end in the locking position on the shaping ring. During the closing of the shaping ring a shifting occurs between the bracket and the one cheek plate element of the shaping ring. This has the significant advantage that the coupling element does not have to be designed to be flexible. This can avoid expensive articulations. The bracket can be produced in a very simple manner from a rigid wire. In a preferred embodiment the bracket is a wire bracket which is essentially U-shaped when viewed in the radial direction of the cheek plate. The bracket can therefore be manufactured in a very simple manner from a piece of wire. Even the manipulating of the clasp in accordance with the invention is very simple. In order to provisionally close the shaping ring all that is necessary is to pivot the bracket into the locking position. To open it the bracket is pivoted in the opposite direction.

The manufacture is particularly simple if the bracket is mounted on the coupling bolts provided for the closing device. One of these coupling bolts serves with its projecting ends consisting of joint bolts for the bracket and other coupling bolt serves in cooperation with the bend of the bracket to determine the opening width of the shaping ring in the coupled position.

According to a further development of the invention at least one cheek plate element adjacent to the closed position comprises at least one projection with which the bracket is locked in its closed position. During the closing of the shaping ring the bracket slides along this projection. The bracket thus remains fixed during the closing of the shaping ring and can be loosened after the pressing procedure by being pivoted. Such a projection can be realized, for example, in a very economical manner as a comparatively short, formed-on cam.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
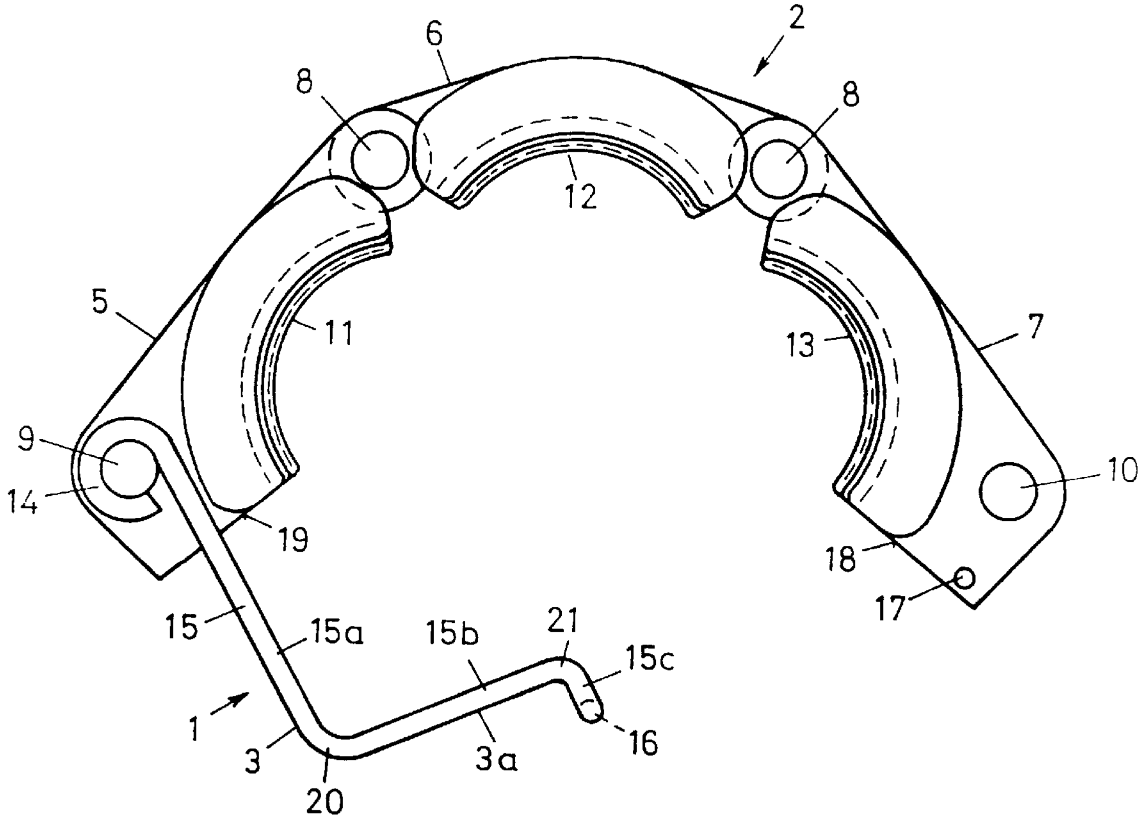
FIG. 1 shows a view of a shaping ring with a clasp in accordance with the invention.
Figure 2:
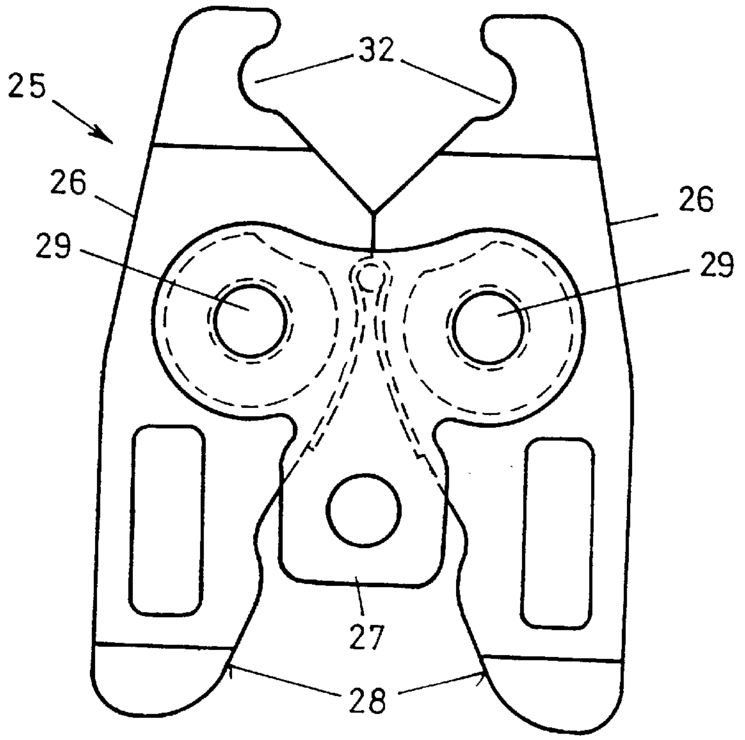
FIG. 2 shows a schematic view of a known locking device.

Shaping ring, or pressring, 2 shown in FIG. 1 comprises a central cheek plate element 6 which is pivotably connected by two symmetrically arranged joint bolts 8 to other cheek plate elements 5,7. Each cheek plate element 5,7 comprises a coupling bolt 9 and 10 on which locking device 25 shown in FIG. 2 can be set for closing shaping ring 2.

Figure 3:
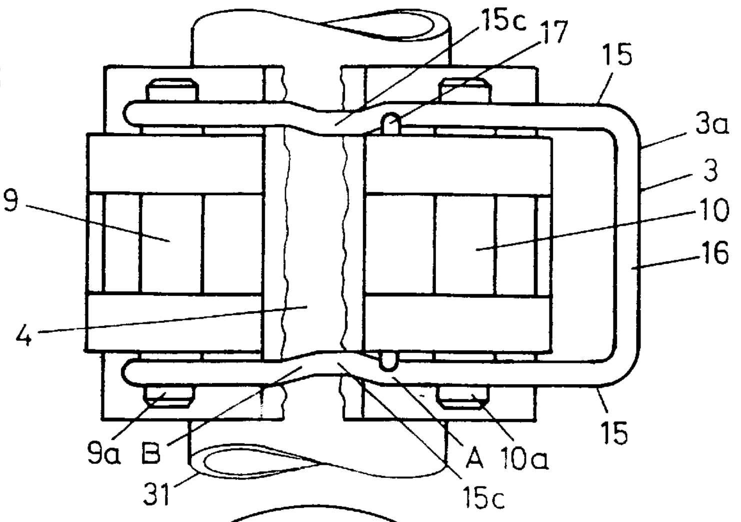
FIG. 3 shows another view of the shaping ring with a clasp in accordance with the invention, which shaping ring is placed around a pipe shown in section here.
Figure 4:
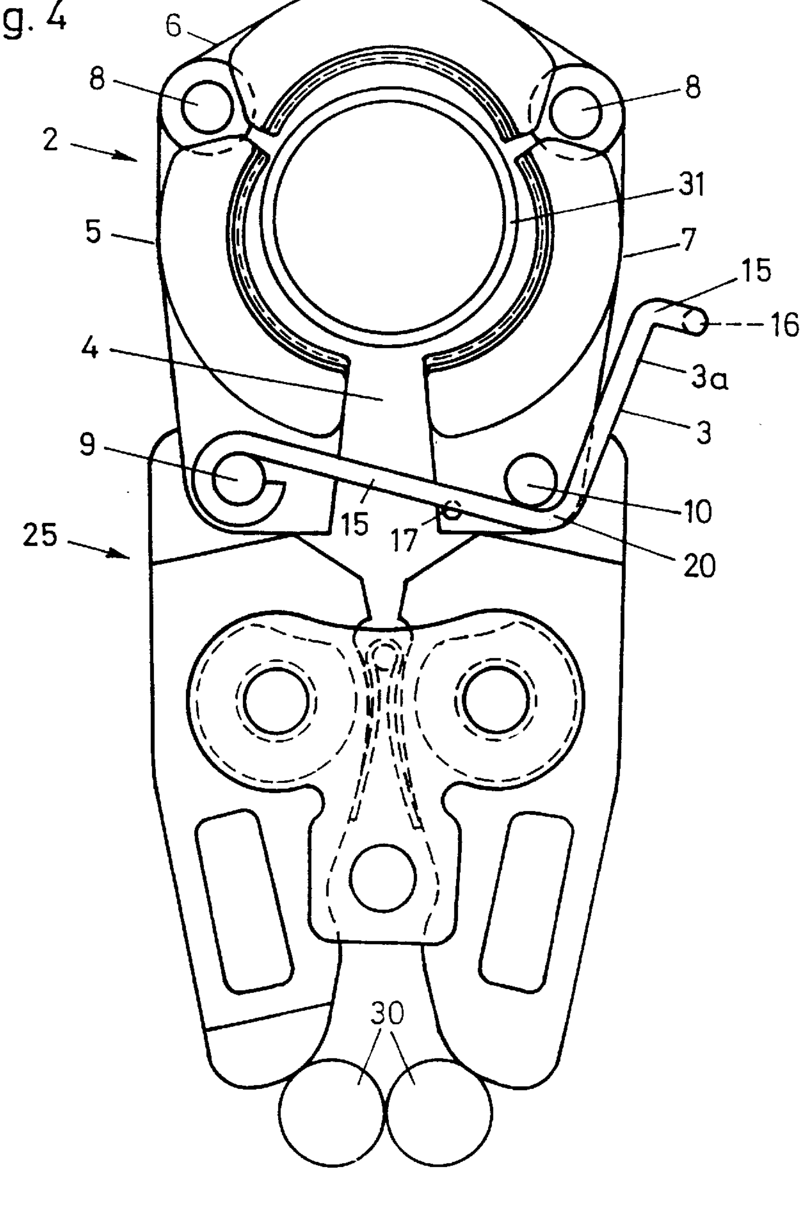
FIG. 4 shows a view of the shaping ring with a clasp in accordance with the invention as well as with a locking device according to FIG. 2 placed on the coupling bolt.
Figure 5:
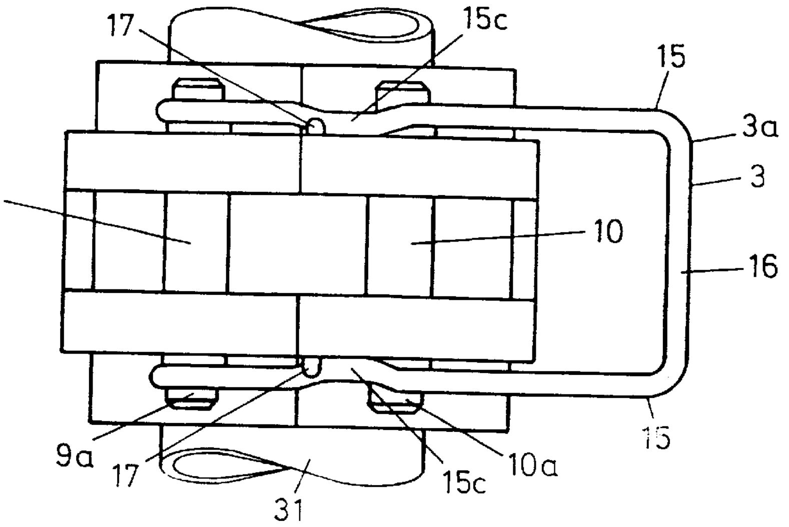
FIG. 5 shows another view corresponding to FIG. 3 but with a closed shaping ring.
Figure 6:
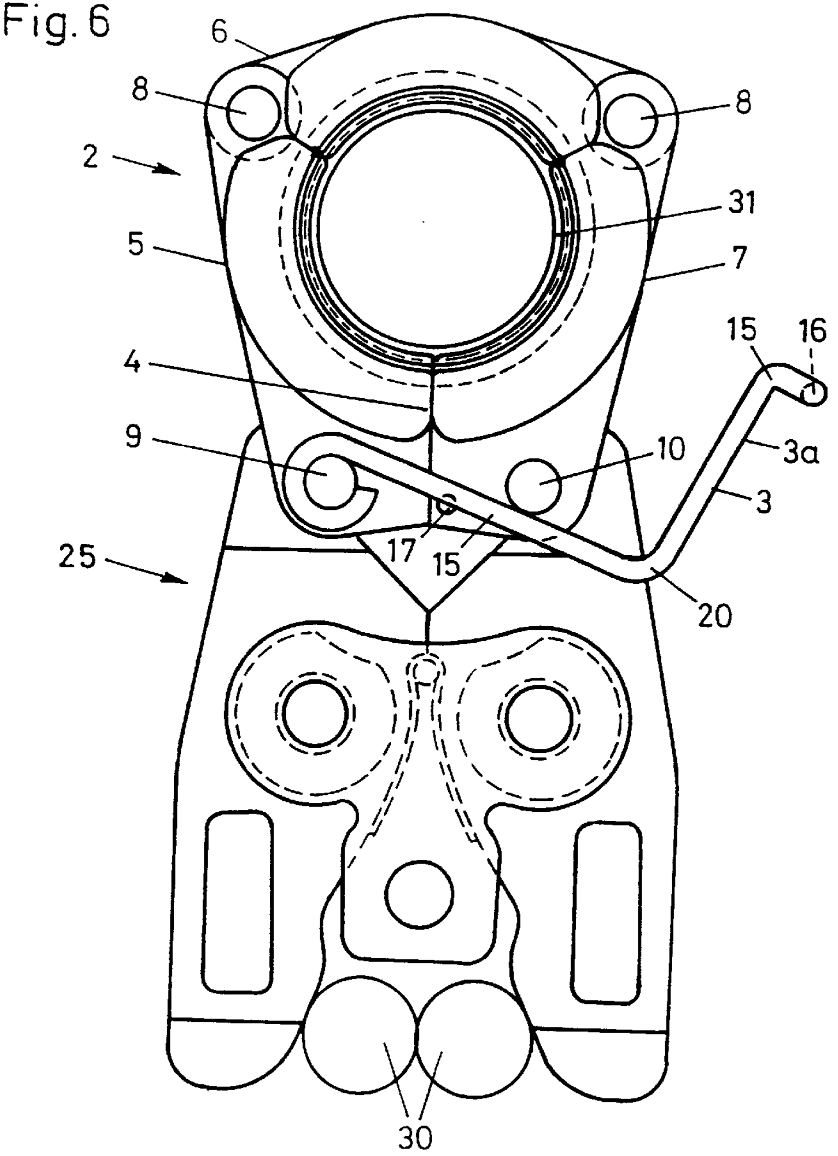
FIG. 6 shows a view corresponding to FIG. 4 but after the shaping ring has been closed.

Locking device 25 is a known commercial product and comprises two levers 26 mounted on a part 27 and pivotable about joint bolts 29 by means of a drive (not shown here). The two levers 26 rest with recesses 32 on the outside of coupling bolts 9, 10. Driver rollers 30 indicated in FIGS. 4,6 attack inclined surfaces 28 of the two levers 26 and as a result pivot the two levers 26 in such a manner that recesses 32 and joint bolts 9, 10 are moved against each other. FIGS. 3,4 shows shaping ring 2 on a pipe 31 and before the locking or pressing of pipe 31. An intermediary space or locking position 4 is located between the two cheek plate elements 5,7. FIGS. 5,6 show shaping ring 2 in a locked, or closed, position. Pipe 31 or a press fitting (not shown here) is pressed around its entire circumference after the locking procedure. Front sides 18, 19 of the two cheek plate elements 5,7 are in contact, as can be seen from FIGS. 5,6.

If shaping ring 2 is placed like a saddle as shown in FIGS. 3,4 on pipe 31 for pressing it, the ring is provisionally locked at the lower ends of the two cheek plate elements 5,6 by clasp 1. This avoids having to hold massive shaping ring 2, which is made of metal and is comparatively heavy, thus leaving both hands free for operating the locking device. Clasp 1 consists essentially of bracket 3, which is preferably a wire bracket. As FIG. 3 shows, the bracket is essentially U-shaped viewed in the radial direction of shaping ring 2 and comprises two shanks 15 running essentially parallel to one another and comprises crosspiece 16. The ends of shanks 15 surround projecting end 9*a* of coupling bolt 9 form an articulation which permits a limited pivoting of bracket 3 about coupling bolt 9.

In FIG. 1 shaping ring 2 is open and can be placed like a saddle on a pipe 31 in order to press a press fitting (not shown here). Locking ring 2 can be provisionally closed by pivoting bracket 3 into the position shown in FIGS. 3 and 4, during which closing position 4 is present between cheek plate elements 5,7 which position is closed, as explained above, with clasping device 25. As FIGS. 3 and 4 clearly show, bracket 3 is approximately Z-shaped and in particular has an angled shape in the view according to FIG. 4. In the locking position bracket 3 rests with two essentially 90° bends 20 on projecting ends 10*a* of coupling bolt 10. Two comparatively short projections 17 are formed on the outside of the cheek plate element at an interval to coupling bolt 10 on which projections bracket 3 rests. Projections 17 form catch cams which bracket 3 can jump over by virtue of a resilient extension when being pivoted in and out. The positions at which projections 17 rest on bracket 3 are designated in FIG. 3 with A. Positions A together with positions B form engagement sites which are formed by bent-out sections 15*c* of shanks 15.

When shaping ring 2 is being closed the two shanks 15 slide between a coupling bolt 10 and a projection 17 along cheek plate element 7 and remain thereby in the engaged position. After the pressing procedure projections 17 rest at the bracket positions designated with B. Bracket 3 has a bend between the two positions A and B. After the shaping ring has been closed it therefore continues to be locked by bracket 3 and can therefore not slide off pipe 31. Locking device 25 is removed from shaping ring 2 after the pressing procedure. Shaping ring 2 can be opened again by pivoting bracket 3 counterclockwise and removed from pipe 21. Shaping ring 2 is now ready for another pressing procedure.

According to FIG. 6 bracket 3 extends over shaping ring 2 with its pivotable end 3*a* and can be reliably grasped on this end 3*a*.

While specific embodiments of the invention have been shown and described in detail to illustrate the application of the principles of the invention, it will be understood that the invention may be embodied otherwise without departing from such principles.

What is claimed is:

1. A pressring that is configured to join workpieces via a circumferential pressing during a locking procedure, comprising:

- a plurality of cheek plate elements that are connected to each other in an articulated fashion and form a pressing circumference about the workpieces in a closed position,
- a coupling bolt that is affixed to a first cheek plate element of the plurality of cheek plate elements, and
- a clasp that includes
  - a bracket having a first end and a second end that is mounted so that it can pivot on the first end on the coupling bolt and which can be connected by the second end to a second cheek plate element of the plurality of cheek plate elements, wherein the bracket is configured to:

- hold the first and second cheek plate elements in an intermediate position that is designed to hold the pressring to the workpieces prior to the locking procedure, and
- allow movement of the second end of the bracket relative to the second cheek plate element during the locking procedure.

2. The pressring according to claim 1, wherein the bracket is essentially U-shaped when viewed radially to the pressring.

3. The pressring according to claim 1, wherein the bracket is designed to be Z-shaped or with an angled shape when viewed axially to the pressring.

4. The pressring according to claim 1, wherein the bracket is a wire bracket and opposite ends of the bracket each surround one end of the coupling bolt.

5. The pressring according to claim 1, wherein at least one cheek plate element comprises at least one projection with which the bracket is engaged in its closed position.

6. The pressring according to claim 5, wherein the projection is a comparatively short cam on a lateral surface of the cheek plate element.

7. The pressring according to claim 1, wherein the bracket comprises a grasping part on its end which can be coupled, extends significantly beyond the pressring and with which the bracket can be pivoted between the closed position and the open position.

8. The pressring according to claim 1, wherein the clasp is essentially rigid.

9. The pressring according to claim 1, wherein the bracket may be pivoted with one hand.

10. A pressring that is configured to join workpieces via a circumferential pressing during a locking procedure, comprising:

- a plurality of cheek plate elements that are connected to each other in an articulated fashion and form a pressing circumference about the workpieces in a closed position,
- a coupling bolt that is affixed to a first cheek plate element of the plurality of cheek plate elements, and
- a clasp that includes
  - a bracket having a first end and a second end that is mounted so that it can pivot on the first end on the coupling bolt and which can be connected by the second end to a second cheek plate element of the plurality of cheek plate elements, wherein:

- the bracket is configured to:
  - hold the first and second cheek plate elements in an intermediate position that is designed to hold the pressring to the workpieces prior to the locking procedure, and
- allow movement of the second end of the bracket relative to the second cheek plate element during the locking procedure;
- at least one cheek plate element comprises at least one projection with which the bracket is engaged in its closed position; and
- the projection is arranged at an interval to an adjacent coupling bolt and the bracket rests in its closed position with one shank against this projection and against a laterally projecting end of the adjacent coupling bolt and runs between the projection and the projecting end in a movable manner during the locking procedure.

11. The pressring according to claim 10, wherein the bracket is essentially U-shaped when viewed radially to the pressring.

12. The pressring according to claim 10, wherein the bracket is designed to be Z-shaped or with an angled shape when viewed axially to the pressring.

13. The pressring according to claim 10, wherein the bracket is a wire bracket and opposite ends of the bracket each surround one end of the coupling bolt.

14. The pressring according to claim 10, wherein the projection is a comparatively short cam on a lateral surface of the cheek plate element.

15. The pressring according to claim 10, wherein the bracket comprises a grasping part on its end which can be coupled, extends significantly beyond the pressring and with which the bracket can be pivoted between the closed position and the open position.

16. The pressring according to claim 10, wherein the clasp is essentially rigid.

17. The pressring according to claim 10, wherein the bracket may be pivoted with one hand.

* * * * *